UNITED STATES PATENT OFFICE.

HANS FOERSTERLING AND HERBERT PHILIPP, OF PERTH AMBOY, NEW JERSEY, ASSIGNORS TO THE ROESSLER & HASSLACHER CHEMICAL CO., OF NEW YORK, N. Y., A CORPORATION OF NEW YORK.

COMPOSITION OF MATTER FOR AND METHOD OF GENERATING HYDROGEN.

977,442.  Specification of Letters Patent.  Patented Dec. 6, 1910.

No Drawing.  Application filed April 4, 1910.  Serial No. 553,263.

*To all whom it may concern:*

Be it known that we, HANS FOERSTERLING, a subject of the Emperor of Germany, and HERBERT PHILIPP, a subject of the King of Great Britain, both residing at Perth Amboy, Middlesex county, New Jersey, have invented a certain new and useful Composition of Matter for and Method of Generating Hydrogen, of which the following is a specification.

This invention relates to a composition of matter which, in the presence of a suitable liquid, will react therewith to generate hydrogen gas.

It is well known that alkali metals generate hydrogen in contact with water and in United States Patent No. 883,531, we have shown one way of generating hydrogen from an alkali metal, such as sodium for example, without danger. It is also well known that metallic silicids, such as for instance, calcium silicid, generate hydrogen by reaction with alkali hydroxids, as for instance caustic soda, according to the following equation:

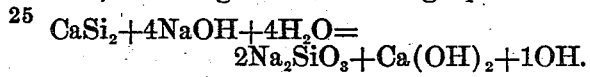

$$CaSi_2 + 4NaOH + 4H_2O = 2Na_2SiO_3 + Ca(OH)_2 + 10H.$$

In order to generate hydrogen from silicids it is however necessary to heat the caustic solution by steam or fuel.

We have found a new composition of matter for generating hydrogen which does not require any means of heating and which generates hydrogen instantly when brought in contact with aqueous or other suitable liquid solutions.

Our invention is based upon the fact that alkali metals when brought in contact with water set free hydrogen forming alkali hydroxids and generate a certain amount of heat. We utilize both the so-formed alkali hydroxid as well as the developed heat units to react upon a silicid to set free further quantities of hydrogen.

In order to make our invention clear we will describe one certain composition of matter as an example: We take 10 kilos of aluminium silicid, commercially known as sical, and grind this to a fine powder; then we take 10 kilos of sodium, put it in a closed mixing or kneading machine, add the 10 kilos of ground sical and heat the apparatus from the outside until all the metallic sodium is molten. Then we start the mixer and let the apparatus cool off, keeping the mixer continuously in rotation during the cooling off; thus we get a very intimate mixture of the sodium metal with the sical. After the mass is completely cooled off, we transfer the mixture to a briqueting press. The sodium being a soft metal allows us to make briquets of the mixture without any further binder. These briquets when reacted upon by water or other suitable liquid generate hydrogen very rapidly.

We have found that the commercial product of aluminium silicid, sical, comes pretty close to the formula $Al_2Si_4$, containing some iron and titanium as impurities. We have further found that 1 kilo of a mixture containing 0.5 kilo sical and 0.5 kilo sodium generates 700 liters of hydrogen. The reaction takes place according to the following equation:

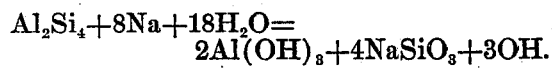

$$Al_2Si_4 + 8Na + 18H_2O = 2Al(OH)_3 + 4NaSiO_3 + 30H.$$

As the best way of generating hydrogen from such a mixture we have found it is desirable to drop water upon the same and not to enter the mixture into the water, especially when working with small quantities. If water is dropped upon the mixture enough heat is generated to let the formed caustic soda react instantly with the silicid.

It must be understood that we do not limit ourselves to a mixture of any particular alkali metals or silicids, such as sical and sodium for instance, or to the particular method of generating hydrogen therefrom as described.

What we claim as our invention is:

1. A composition of matter for generating hydrogen containing an alkali metal and a silicid.

2. A composition of matter for generating hydrogen containing metallic sodium and a silicid.

3. A composition of matter for generating hydrogen containing sodium and aluminium silicid.

4. A composition of matter for generating hydrogen comprising a mixture of an alkali metal and a silicid.

5. A composition of matter for generating hydrogen comprising a mixture of metallic sodium and a silicid.

6. A composition of matter for generating hydrogen comprising a mixture of sodium and aluminium silicid.

7. A method of generating hydrogen, consisting in reacting an aqueous solution with an alkali metal and a silicid.

8. A method of generating hydrogen consisting in reacting an aqueous solution with metallic sodium and a silicid.

9. A method of generating hydrogen consisting in reacting an aqueous solution with metallic sodium and aluminium silicid.

10. A method of generating hydrogen consisting in reacting water with an alkali metal and a silicid.

11. A method of generating hydrogen consisting in reacting water with metallic sodium and a silicid.

12. A method of generating hydrogen consisting in reacting water with metallic sodium and aluminium silicid.

13. A method of generating hydrogen consisting in reacting an alkali metal and a silicid with a suitable liquid.

14. A method of generating hydrogen consisting in reacting metallic sodium and a silicid with a suitable liquid.

15. A method of generating hydrogen consisting in reacting metallic sodium and aluminium silicid with a suitable liquid.

In testimony whereof we have signed this specification in the presence of two subscribing witnesses.

HANS FOERSTERLING.
HERBERT PHILIPP.

Witnesses:
L. M. Rossi,
Emil Kans.